US006467057B1

(12) United States Patent
Wang et al.

(10) Patent No.: US 6,467,057 B1
(45) Date of Patent: Oct. 15, 2002

(54) SCAN DRIVER OF LCD WITH FAULT DETECTION AND CORRECTION FUNCTION

(75) Inventors: Bo-Wen Wang, Taipei; Shang-Li Chen, Taichung, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/516,534

(22) Filed: Mar. 1, 2000

(51) Int. Cl.[7] ................................................ H04B 17/00

(52) U.S. Cl. ........................................................ 714/726

(58) Field of Search ................................ 714/726, 724, 714/733, 734

(56) References Cited

U.S. PATENT DOCUMENTS 4,669,066 A * 5/1987 Kagawa et al.
4,811,343 A * 3/1989 Johansson et al.
5,059,834 A * 10/1991 Tago et al.
5,410,551 A * 4/1995 Edwards et al.

* cited by examiner

*Primary Examiner*—Phung M. Chung

(57) ABSTRACT

A scan driver of LCD with fault detection and correction circuit is disclosed herein. The scan driver fabricated on a glass substrate locates at both ends of the scan buses can simultaneously drive the scan buses from both ends. The fault detection and correction circuit of the scan driver is used to determine whether transmitting signal from a DFF at present stage into a DFF at next stage, or transmitting signal from the other DFF at present stage through a scan bus into the other DFF. The fault detection and correction circuit includes the first detecting device, the second detecting device, the control signal generating device, and the transmission control device. The first and the second detecting device generate a first logic level and a second logic level responding to a stuck-at-zero fault and a stuck-at-one fault respectively. The control signal generating device generates a first control signal when all input terminals exhibiting a second logic level, and generates a second control signal when one of input terminals exhibiting the first logic level. The transmission control device can transmit signal from one DFF to the other and to the scan bus responding to the first control signal, also can isolate them and the scan bus responding to the second control signal.

25 Claims, 10 Drawing Sheets

<Prior Art>

<Prior Art>

<Prior Art>

<Prior Art>

<Prior Art>

<Prior Art>

<Prior Art>

SCAN DRIVER OF LCD WITH FAULT DETECTION AND CORRECTION FUNCTION

BACKGROUND OF THE INVENTION

1. Field of the Invention

This invention relates to a scan driver of liquid crystal display (LCD), and particularly relates to a scan driver of liquid crystal display with fault detection and correction function.

2. Description of the Prior Art

In fabricating LCD (Liquid Crystal Display) panel, the TFT (Thin Film Transistor) are frequently utilized, and the LTPS (Low Temperature Polycrystalline Silicon) technology is employed to fabricate the TFT in the lately technology. Usually, in the LTPS process, the scan driver is fabricated on the glass substrate, on which the, TFT LCD is fabricated. However, the yield of the processes fabricating the scan driver is not stable, so the redundant scan driver shift register is necessary for the LCD. The fault detection and correction circuit of the shift register of the scan driver mentioned above is used to avoid the scan driver failure due to any failure of scan driver shift register.

In the prior art, all the fault detection and correction circuits are fabricated on a single side of a glass substrate. In other words, the scan driver on the glass substrate is fabricated on a single side (left or right). Even though the scan drivers are fabricated on both sides (left and right) of the glass substrate in a temp to simultaneously drive the gate buses of the TFT array, the prior art still can not drive the gate buses simultaneously from both sides. The purpose of the present invention is to propose the circuit for fault detection and correction such that the gate buses can be driven from a single side or simultaneously from both sides of the transparent (such as glass) substrate.

In the traditional TFT LCD, the mobility of the carrier in the amorphous silicon utilized to fabricate the TFT on the panel is lower than that in the crystal silicon utilized in the normal semiconductor device. So the process utilizing amorphous silicon can be used to fabricate the thin film transistor (TFT) on the panel as switches only. The process mentioned above can not be used to fabricate the transistor in the data driver or the scan driver. Thus, the scan driver and the data driver can only be fabricated in the integrated circuit using silicon as substrate instead of using glass panel. The configuration of the TFT LCD is shown in FIG. 1, in which the panel 10 is made of glass, and the TFT array is fabricated on the panel 10. The scan driver integrated circuit 11 and the data driver integrated circuit 12 are both utilized to drive the transistor in the TFT array. The TFT array mentioned above includes many transistors (TFT) 14, each connecting a transparent electrode 16. In the prior art shown in FIG. 1, since the scan driver 11 and the data driver 12 are fabricated on the substrate other than the glass substrate, they must be attached to the panel 10. The assembly takes additional effort and costs.

As the technology proceeds, the low temperature polycrystalline silicon (LTPS) technology is developed to fabricate the TFT LCD, and the polycrystalline silicon can be used to fabricate the transistors for not only switches in pixels but also scan driver circuit as well as in the data driver circuit. In other words, by using the LTPS technology, the scan driver and the data driver can be fabricated on the same panel (glass substrate) of the LCD such that the cost of the LCD is reduced. The configuration of the LCD mentioned above is shown as FIG. 2, in which the panel 20 is made of glass, and the TFT array is fabricated on the panel 20. The scan driver 21 and the data driver 22 are utilized to drive the TFT array. The TFT array mentioned above includes many transistors (TFT) 24, each connecting a transparent electrode 26. In the prior art shown in FIG. 2, the scan driver 21 and the data driver 22 are fabricated on the panel (glass substrate) 20. As shown in FIG. 2, the scan driver 21 is at one side of the panel 20 and is used to sequentially drive each gate bus connecting to the gate of each thin film transistor. Because only one set of scan driver is provided on the panel, any fault on the scan driver may degrade the panel and affect the yield rate.

In order to literally utilize the fault detection and correction circuit in the scan driver, and to rapidly drive the gate buses on the panel, a configuration with scan driver at both sides of the panel is provided. As shown in FIG. 3, the TFT array is fabricated on the panel 30, which is made of glass. The scan driver integrated circuit 31 and the data driver integrated circuit 32 are both utilized to drive the transistors in the TFT array. The TFT array mentioned above includes many transistors (TFT) 34, each connecting a transparent electrode 36. In the prior art shown in FIG. 3, the scan driver integrated circuit 31 and the data driver integrated circuit 32 are fabricated on the panel (glass substrate) 30, and the scan driver 31 is fabricated on both sides of the panel (glass substrate) 30. Because the scan driver 31 at both sides of the panel can drive the gate bus, it is easier to drive the transistors on each gate bus.

The circuit diagram of the scan driver shown in FIG. 1, FIG. 2, and FIG. 3 is a traditional one that composed of serial connected D-type flip flops (D-type FF:DFF), which is shown in FIG. 4A. The input terminal IN is coupled to the first D-type FF Q1, in addition, the terminal CK provides the clock pulse to the first D-type FF Q1, the second D-type FF Q2, and third D-type FF Q3 . . . etc. The waveform of the signal on the input terminal IN, the terminal CK, the output of the first D-type FF Q1, the second D-type FF Q2, and the third D-type FF Q3 are shown in FIG. 4B. Because of the pulse on each output terminal of the shift registers, all the transistors (TFT) on the scan bus are activated (on).

When the LTPS process is utilized to fabricate the shift register of the scan driver integrated circuit, the resulted shift register often fail, and thus the stuck-at-zero fault or the stuck-atone fault of the output of the shift register is frequently resulted. To solve this problem, three identical shift registers are fabricated instead of one shift register, and the majority of the output of the three identical shift registers is taken to represent the output of all the shift registers. The other method employed to solve the foregoing issue is to utilize laser to cut off and thus block the failed region. This is usually used in the one-side-driving-model LCD, i.e., the scan driver fabricated on only one side of the panel of the LCD, such as that shown in FIG. 2.

At the beginning of developing LCD manufacturing technology, in order to overcome the issue of low yield, usually, an “OR” gate is connected to three sets of serial connected D-type FFs. The OR gate mentioned above is used to transmit the correct signal to the following sets of serial connected D-type FFs. As shown in FIG. 5A, it is clear that when a stuck-at-zero fault happened in any set of the serial connected D-type FFs, the correct signal (logic one or logic zero) can be transmitted to the following sets of serial connected D-type FFs, even there is only one set of serial connected D-type FF works properly. On the other hand, when there is a stuck-at-one fault happened in a set of the serial connected D-type FFs, the output of the OR gate 40 will stuck at logic one too. When the phenomenon happened, an detection is made through the test pad to find out which output(s) of the set of the serial connected D-type FFs is stuck at logic one. After finding which set of serial connected D-type FFs is stuck at one, e.g., the set of serial connected D-type FFs 41 is stuck at one, laser is utilized to cut off the output of the set of serial connected D-type FFs 41. For example, the laser can focus at point P1 to cut off the set of serial connected D-type FFs 41. So the input of the OR gate 40 which stuck at logic one is prevent from connecting to the OR gate 40, and the "floating" phenomenon will not happen because each input terminal of the OR gate 40 is coupled to ground through a resistor. However, it is impossible to fabricate test pad between each two DFFs because the test cost will terribly increase. If the prior art scan driver with redundancy function have the structure shown in FIG. 5A, the disadvantages are described above.

Besides, to avoid the LCD become. useless due to one shift register fail, the prior art proposed a circuit without using test pad and laser. The circuit diagram of the circuit mentioned above is shown in FIG. 5B, which is similar to that shown in FIG. 5A. According to the circuit diagram shown in FIG. 5B, the majority-dominating circuit 49 is placed between each two neighboring stage of DFFs to replace the test pad and the grounding resistors. Besides, when any fault happened in the shift register, it is unnecessary to use laser to cut off the shift register because of the majority-dominating circuit 49. According to FIG. 5B, if the majority of the points A, B, and C have logic zero, the output of the majority-dominating circuit 49 is at the level of logic zero. On the contrary, if the majority of the points A, B, and C have logic one, the output of the majority-dominating circuit 49 is at the level. of logic one. Even one DFF break down, the majority-dominating circuit 49 can output correct signal to the next stage of DFF.

The two types of prior art shift register mentioned above are based on one-side-driving consideration. As for the two-side-driving configuration shown in FIG. 3, once the shift register at one side fails, that is, it's output is different from the corresponding one across the panel, the voltage on the gate buses being following the failed stage will vary from one side to the other, also causing DC current flowing through the scan lines, and making this panel unacceptable.

SUMMARY OF THE INVENTION

A driving apparatus of a LCD (Liquid Crystal Display) with fault detection and correction function is proposed by the present invention. So the scan driver according to the present invention can drive the scan line either from one side or from both sides of the scan line. The driving apparatus according to the present invention includes the following elements.

The first driving device is used to transmit signal from the previous stage through the present stage to the next stage. Also, the second driving device is used to transmit signal from the previous stage through the present stage to the next stage. The plurality of scan buses couples the first driving device and the second driving device of a same stage, and each of the first driving device and the second driving device includes a plurality of D-type flip flops (DFF) and a plurality of fault detection and correction circuits in the present invention. The input terminals of each of the plurality of fault detection and correction circuits is coupled to output terminal of one of the plurality of DFFs at previous stage and is coupled to output terminal of one of the plurality of DFFs at present stage. Each of the output terminal of each of the plurality of fault detection and correction circuits is coupled to one bus of the plurality of scan buses and one of the plurality of DFFs at next stage. The fault detection and correction circuit is utilized to determine whether transmit signal from a first Delay type Flip Flop (DFF) at present stage into input terminal of a second DFF at next stage, or transmit signal from a third DFF at present stage through a scan bus into the second DFF.

The fault detection and correction circuit of the driving apparatus according to the present invention includes the following elements. The first detecting device generates a first logic level at output terminal of the first detecting device responding to a stuck-at-zero fault happened in the first DFF. The first DFF, the second DFF, the third DFF, and the scan bus is formed on a silicon substrate or on a transparent substrate such as glass. The output terminal of a fourth DFF at previous stage is coupled to the input terminal of the first detecting device.

The second detecting device generates the first logic level at output terminal of the second detecting device responding to a stuck-at-one fault happened in the first DFF. The control signal generating device generates a first control signal when all input terminals of the control signal generating device exhibiting a second logic level. The control signal generating device generates a second control signal when one of input terminals of the control signal generating device exhibiting the first logic level, the output terminals of the first detecting device and the second detecting device is coupled to input terminals of the control signal generating device.

The transmission control device transmits signal from the first DFF to the second DFF and the scan bus responding to the first control signal. The transmission control device cuts off electrical coupling between the first DFF and the second DFF as well as the scan bus responding to the second control signal, and then signal from the third DFF is transmitted through the scan bus to the second DFF. One side of the scan bus is electrically coupled to the first DFF locating at one side of the transparent substrate, the other side of the scan bus is electrically coupled to the second DFF locating at the other side of the transparent substrate. The stuck-at-zero fault is defined as-output terminal of the first DFF keeping at the first logic level when output terminal of the fourth DFF at previous stage changing from the logic one (logic high) to the logic zero level (logic low). In conclusion, when the output of a DFF is permanently equal to logic zero no matter what the input is, the DFF is defined as having the stuck-at-zero fault. The stuck-at-one fault is defined as output terminal of the first DFF keeping at the second logic level when all output terminals of all the DFFs changing from logic one (logic high) to logic zero (logic low). In conclusion, when the output of a DFF is permanently equal to logic one no matter what the input is, the DFF is defined as having the stuck-at-one fault. The activity of a plurality of thin film transistors is controlled by the signal on the scan bus, which electrically coupled to the gates of the plurality of TFTs. In addition, the electricity of the plurality of thin film transistors controls the orientation of polarity of molecule of liquid crystal placed over the transparent substrate.

The first detecting device, the second detecting device, the control signal generating device, and the transmission control device is fabricated by a LTPS (Low Temperature Polycrystalline Silicon) technology. The first detecting device in one preferred embodiment of the present invention includes a first NAND gate, a first transistor, a second transistor, a third transistor, a fourth transistor, a fifth transistor, a first inverter, a second inverter, and a first NAND gate. The second detecting device in one preferred embodiment of the present invention includes a sixth transistor, a seventh transistor, and a second NAND gate.

The control signal generating device in one preferred embodiment of the present invention including a third NAND gate and a third inverter. The output terminals of the control signal generating device are coupled to the transmission control device to provide the first control signal and the second control signal to the transmission control device. In addition, each of the first control signal and the second control signal includes a logic high level and a logic low level. The transmission control device according to the present invention is a transmission gate including a CMOS (Complementary Metal Oxide Semiconductor Field Effect Transistor) transmission gate having a first control gate, a second control gate, an input terminal, and an output terminal. Either the first control signal or the second control signal is coupled to the first control gate and the second control gate at a time.

The CMOS transmission gate is conductive between the input terminal and the output terminal when the first control signal is coupled to the first control gate and the second control gate. The CMOS transmission gate is insulating between the input terminal and the output terminal when the second control signal is coupled to the first control gate and the second control gate. The first logic level in one preferred embodiment of the present invention is a logic low level, and the second logic level is a logic high level.

BRIEF DESCRIPTION OF THE DRAWINGS

The above features of the present invention will be more clearly understood from consideration of the following descriptions in connection with accompanying drawings in which.

DESCRIPTION OF THE PREFERRED EMBODIMENT

Figure 1:
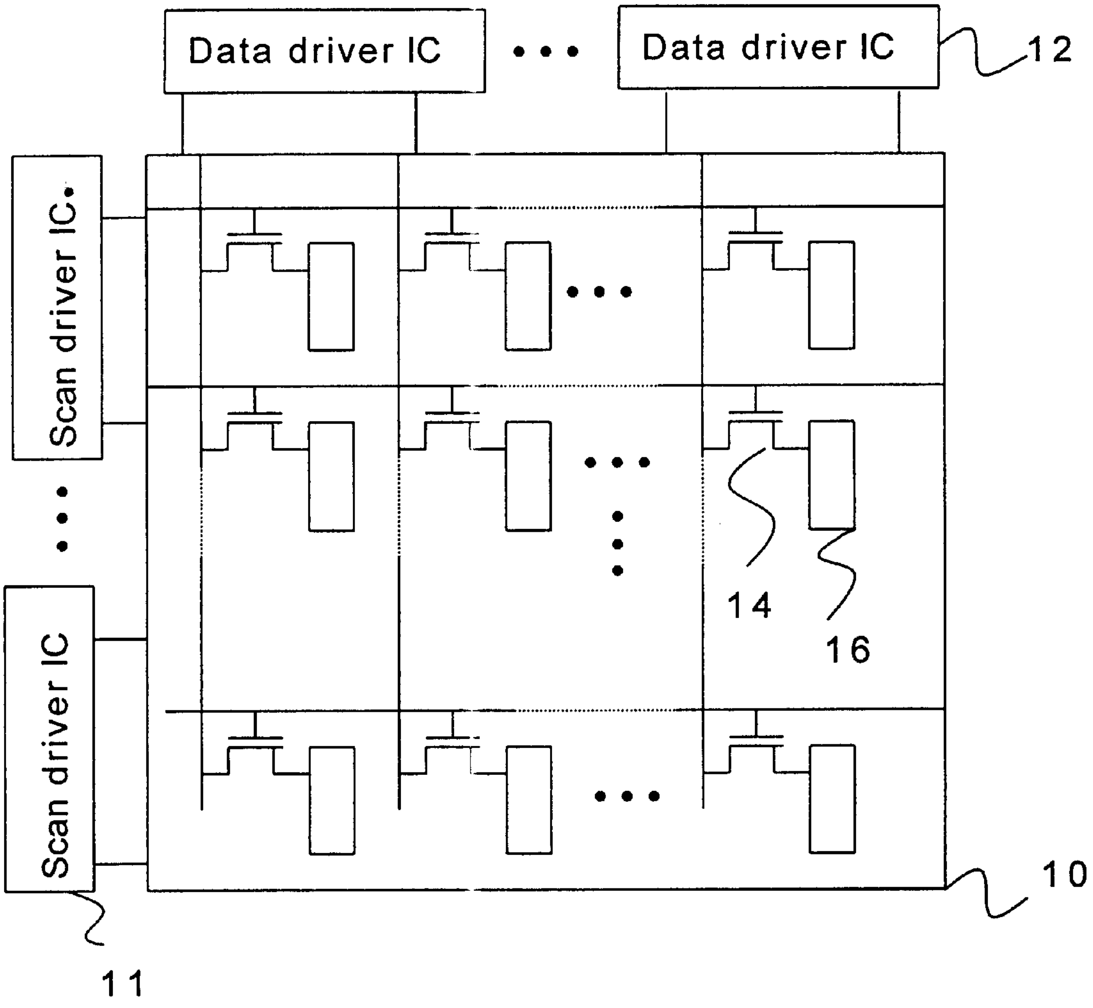
FIG. 1 illustrates the structure of the prior art LCD panel with scan driver fabricated on silicon substrate outside the panel, on which amorphous silicon TFT is fabricated.
Figure 2:
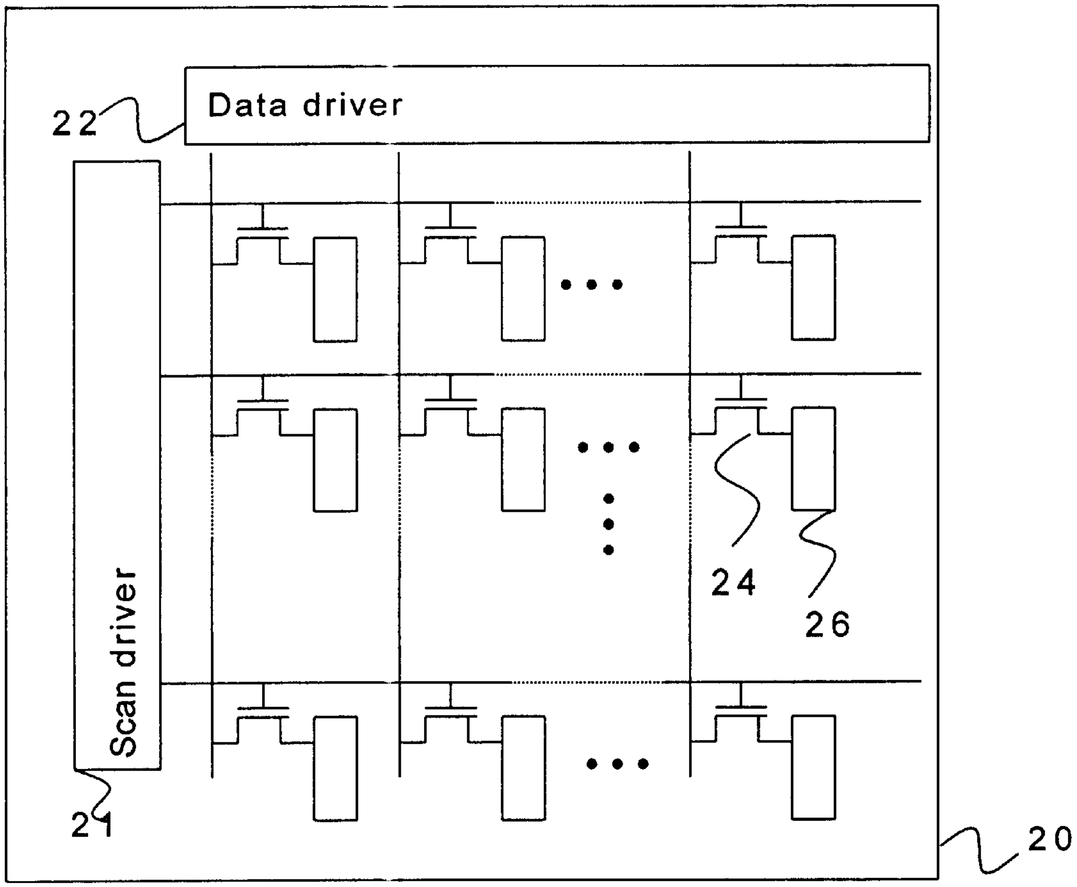
FIG. 2 illustrates the structure of the prior art LCD, in which the scan driver made of polycrystalline silicon being fabricated at one side of the substrate, on which the polycrystalline silicon TFT is fabricated.
Figure 3:
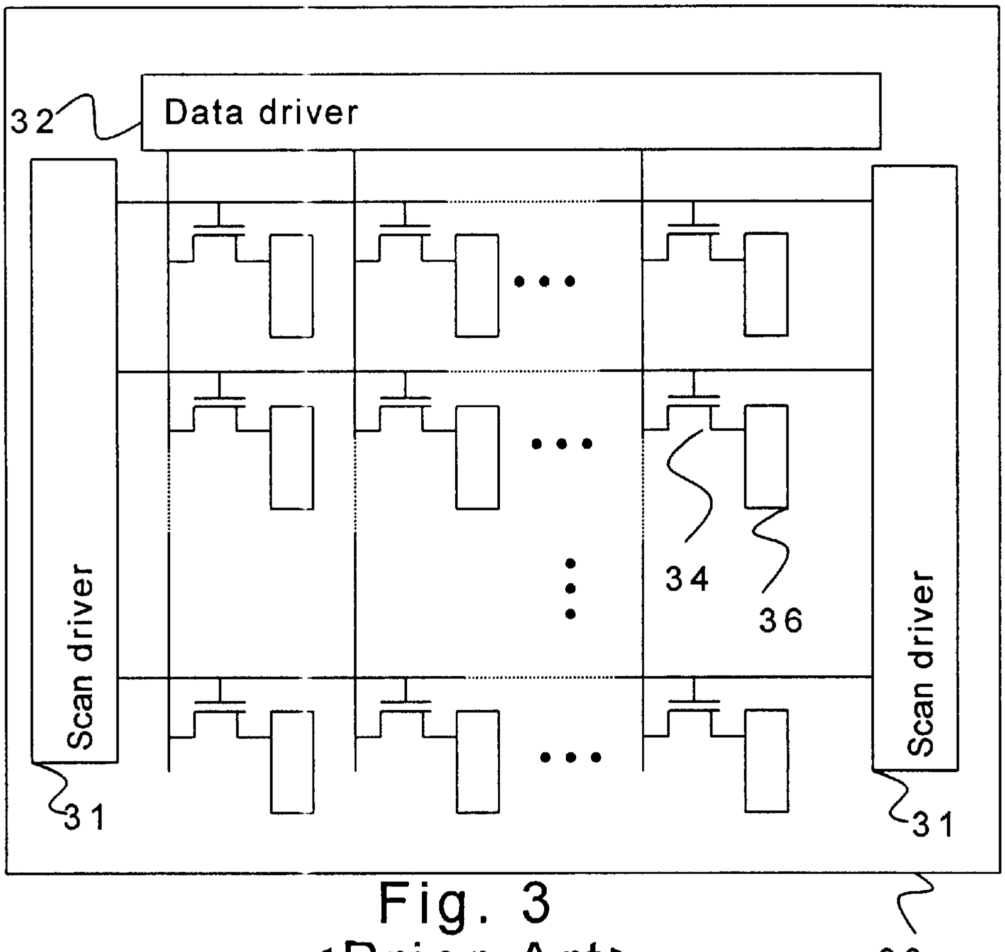
FIG. 3 illustrates the structure of the prior art LCD, in which the scan driver made of polycrystalline silicon being fabricated at both sides of the substrate, on which the polycrystalline silicon TFT is fabricated.
Figure 4A:
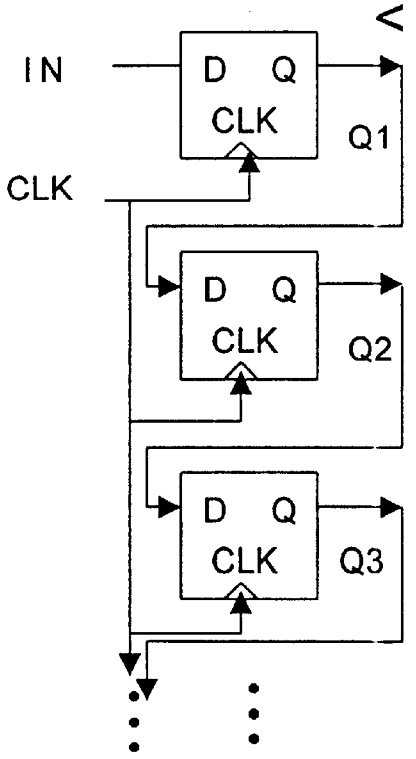
FIG. 4A illustrates connection of the shift register including a column of D-type Flip-Flop (DFF), which makes up a scan driver in the prior art.
Figure 4B:
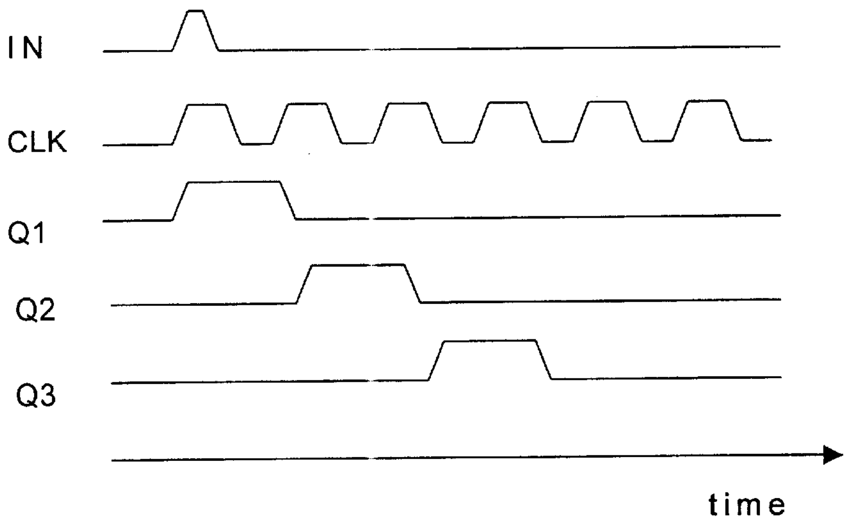
FIG. 4B illustrates the waveform of each terminal of the DFF of the shift register in the prior art.
Figure 5A:
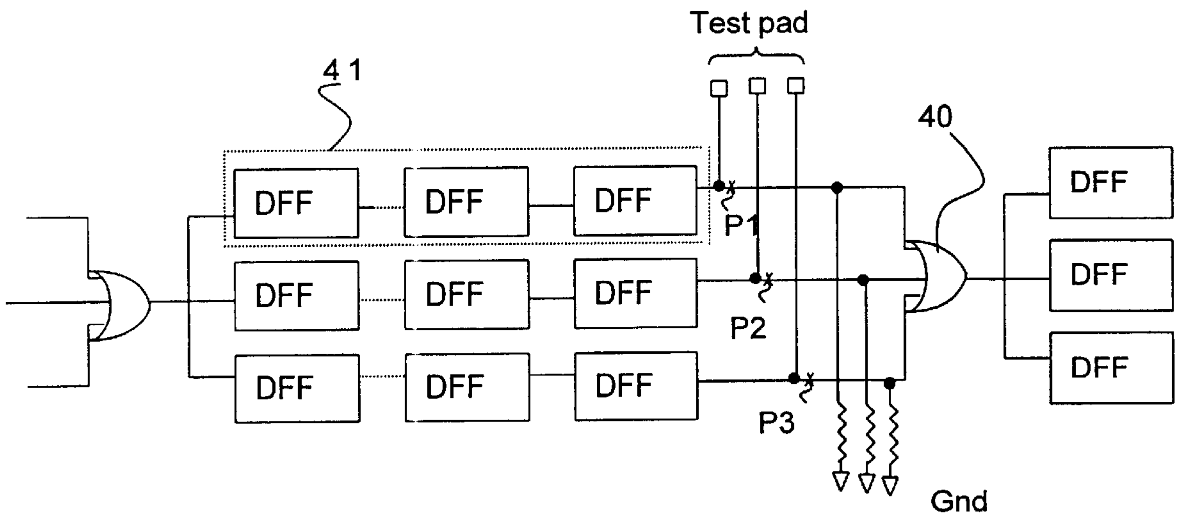
FIG. 5A illustrates the prior art scan driver with redundancy utilizing laser for cutting off serial connected DFFs, in which stuck-at-one fault or stuck-at-zero fault happened.
Figure 5B:
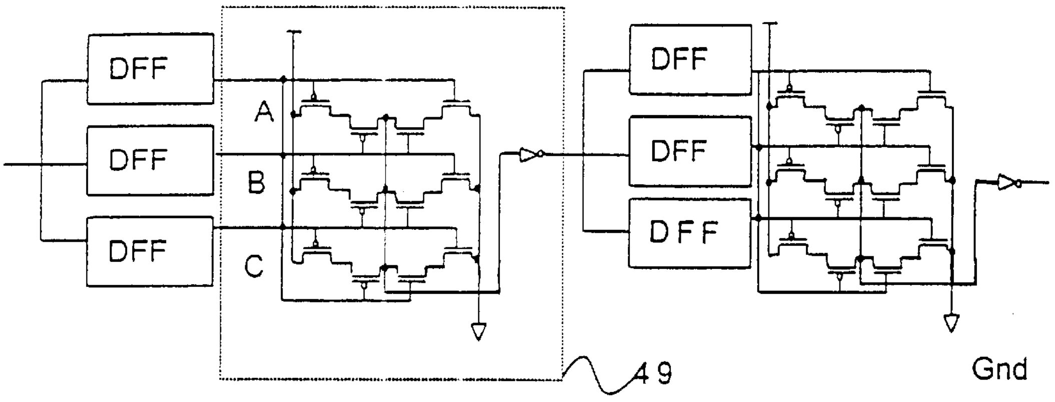
FIG. 5B illustrates the prior art scan driver with redundancy utilizing majority dominate circuit, which prevent the influence of stuck-at-one fault or stuck-at-zero fault.

Because the prior art shift register of LCD with fault detection and correction function is based on one-side-driving model, and it has its serious problem due to yield instability of transistor utilizing LTPS technology. The preferred embodiment of the present invention proposes a scan driver of LCD with fault detection and correction circuit without using one-side-driving model, which has its circuit diagram shown in FIG. 6. For example, the scan driver of LCD with fault detection and correction function proposed by the preferred embodiment of the present invention is based on two-side-driving model. The structure of the LCD using the scan driver, which utilizes the shift register with fault detection and correction function proposed by one preferred embodiment of the present invention is shown in FIG. 3. Though the structure is the same as that of the prior art, the shift register with fault detection and correction function proposed by the present invention enables the two scan drivers driving a scan bus simultaneously because of the fault detection and correction circuit shown in FIG. 6.

Figure 6:
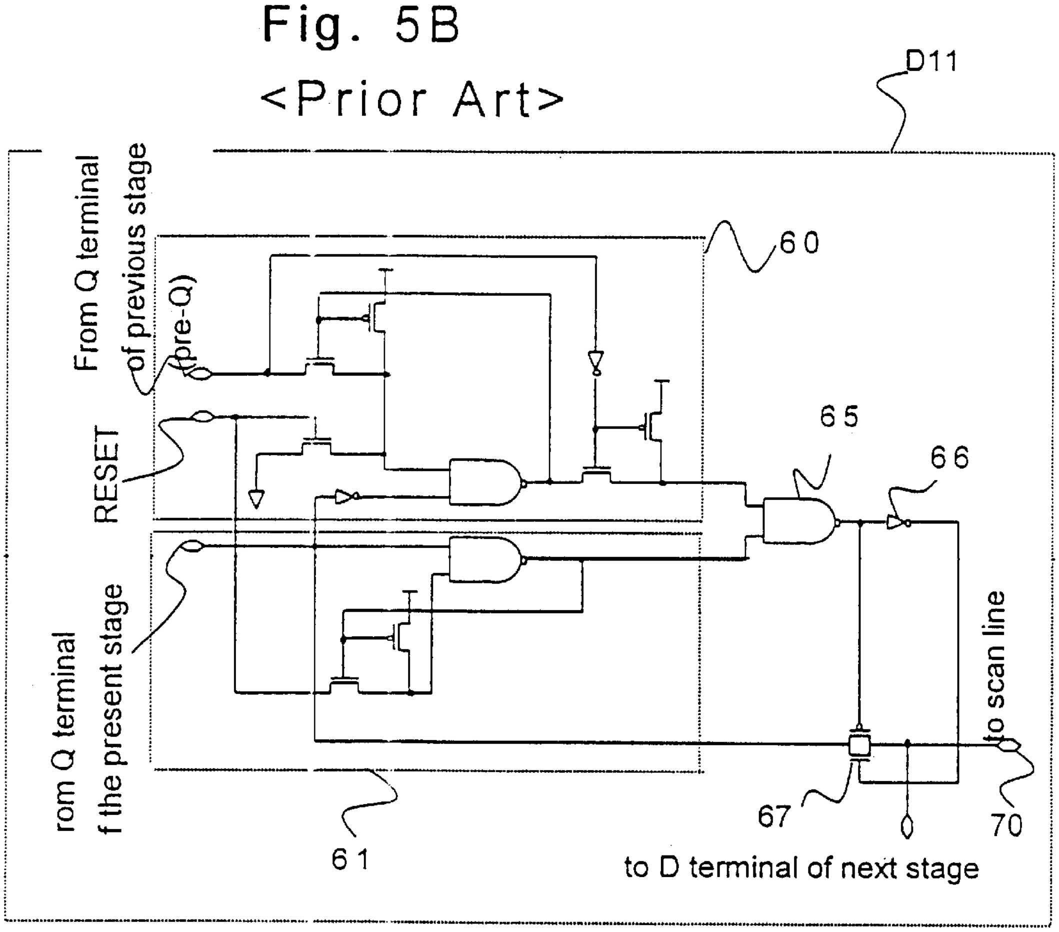
FIG. 6 illustrates the circuit diagram of the fault detection and correction circuit in one preferred embodiment of the present invention.
Figure 7:
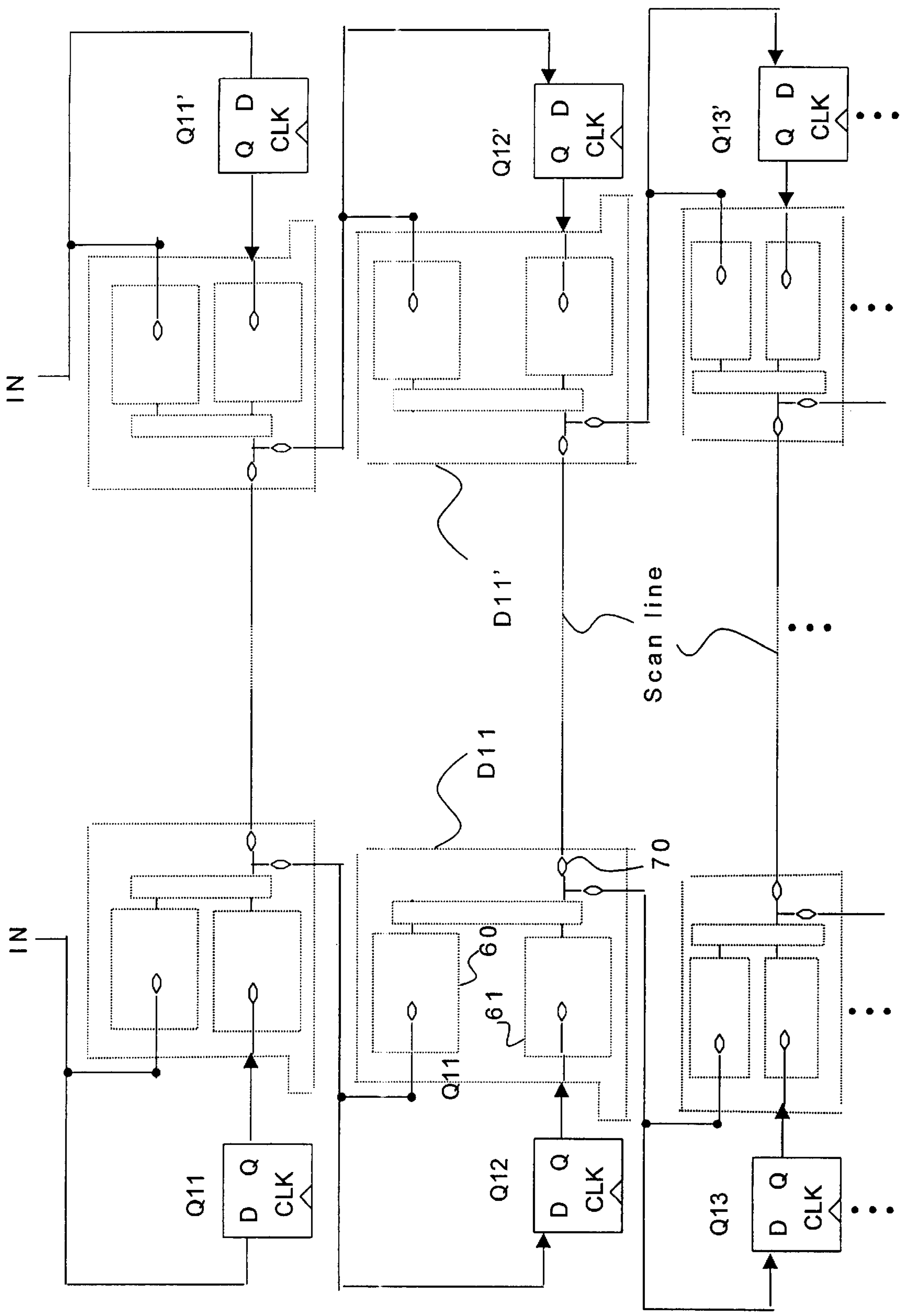
FIG. 7 illustrates the connection between the column of DFFs and the fault detection and correction circuit at the same side of the panel of the LCD in one preferred embodiment of the present invention.

The circuit diagram of the fault detection and correction circuit D11 according to one preferred embodiment of the present invention shown in FIG. 7 is included in the scan driver of LCD, which having fault detection and correction circuit is shown in FIG. 6. In which the output of the stuck-at-zero detecting device 60 and the stuck-at-one detecting device 61 is coupled to the NAND gate 65. The fault detection and correction circuit D11 is designed to act as the fault detection and correction circuit to detect whether the stuck-at-one fault or the stuck-at-zero fault happened in the output terminal of DFF Q12. One of the input terminals (such as terminal Pre-Q) of the stuck-at-zero detecting device 60 is, for example, coupled to the output terminal of the fault detection and correction circuit in the previous stage. The input terminal of the stuck-at-one detecting device 61 is coupled to the Q terminal of the DFF Q12 (FIG. 7). The output terminal of the NAND gate 65 is fed to the inverter 66, in addition, the output terminal of the inverter 66 and the output terminal of the NAND gate 65 provide control voltage for the transmission gate 67. When the output terminal of the NAND gate 65 is at the first logic level (such as logic high level), the signal from the Q terminal of the DFF of this stage (such as DFF Q12) is transmitted to the D terminal of the DFF of the next stage (such as DFF Q13) and to the scan bus connected to the Q terminal of the DFF Q12.

In one preferred embodiment of the present invention, referring to FIG. 6, the transmission gate 67 determines whether the output of the Q terminal of the DFF Q12 charges/discharges the scan bus (FIG. 7) connected to the terminal 70. In one preferred embodiment of the present invention, the transmission gate 67 can be a CMOS transmission gate, which is composed of a PMOS coupled with a NMOS. The control gate of the transmission gate is the gate of the PMOS and the NMOS.

In the preferred embodiment of the present invention, when the output of a DFF is permanently equal to logic zero no matter what the input is, the DFF is defined as having the stuck-at-zero fault. On the other hand, when the output of a DFF is permanently equal to logic one no matter what the input is, the DFF is defined as having the stuck-at-one fault.

When there is something wrong with the DFF Q12, such as stuck-at-one or stuck-at-zero fault happened, the transmission gate 67 would be turned off, so the DFF Q12 has nothing to do with the scan line connected to the terminal 70. Instead, the input signal of the DFF Q13 is provided by the scan line connected to the fault detection and correction circuit D11', which is coupled to the output terminals of the output terminal of the fault detection and correction circuit in the previous stage and the DFF Q12'. So the input signal to the DFF Q13 is from the DFF Q12' (previous stage) on the other side of the panel 30 (FIG. 3). In order to be brief, the circuit diagram of the fault detection and correction circuit D11 is the same as that of the fault detection and correction circuit D11' (FIG. 7) and the other fault detection and correction circuits (not illustrated). In one preferred embodiment of the present invention, referring to FIG. 7, the output of the fault detection and correction circuit of the previous stage (DFF Q11) and the output of the D flip flop of the this stage (DFF Q12) are fed to the fault detection and correction circuit (such as D11).

In addition, if there is nothing wrong with the fault detection and correction circuit (D11), the output of the D flip flop of this stage (DFF Q12) is fed to the scan bus and the D terminal of the DFF of the next stage (Q13). In other words, the output of the fault detection and correction circuit of this stage depends on the result of detecting the output of the DFF of this stage and the previous stage by the fault detection and correction circuit according to the present invention. According to the present invention, there is a fault detection and correction circuit between each two DFFs in the scan driver on one side of the panel.

Figure 8:
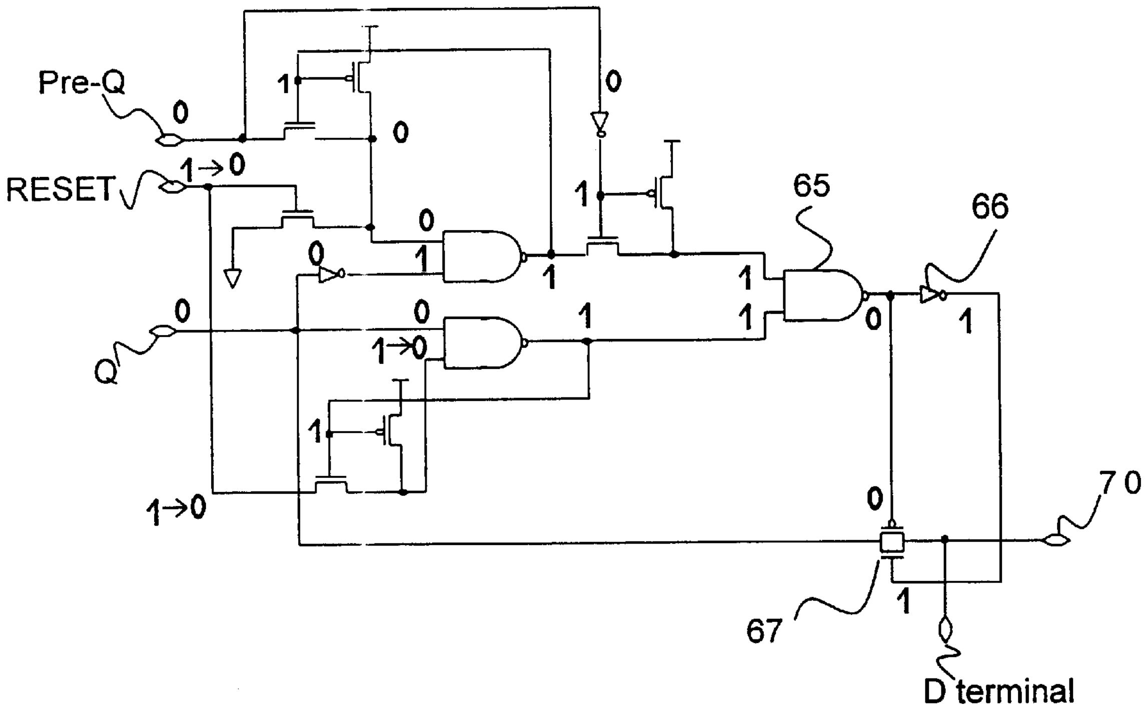
FIG. 8 depicts the logic level transition of each node of the fault detection and correction circuit in the present invention at the initial state.

To detail how the fault detection and correction circuit according to the present invention detects the stuck-at-zero fault and the stuck-at-one fault, FIG. 8 depicts the logic level transition of each node of the fault detection and correction circuit at the initial state. At first, the transition of logic level at each node is illustrated in FIG. 8, in which the number 0 demonstrate logic level zero in the present period, and the number 1 demonstrate logic level one at the present period. In addition, the arrow denotes the transition of logic level from a previous period to a following period. Assume all the DFFs has the reset function, i.e., all the DFFs can be set to the low logic level, and the all the fault detection and correction circuits are in a stable state to enable all the DFFs charge/discharge the scan buses, as well as provide input for the DFF in the next stage.

Figure 9A:
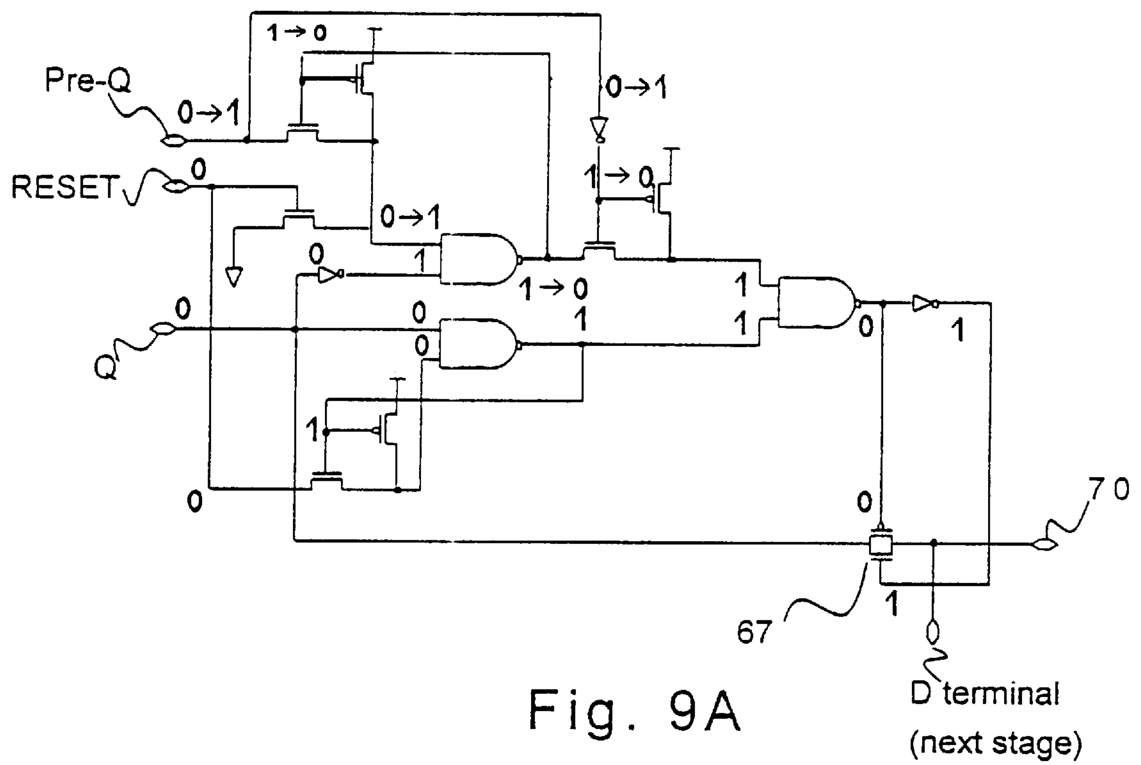
FIG. 9A depicts the logic level transition at each node of the fault detection and correction circuit in the present invention when the high voltage level is transmitted to the DFF of the previous stage.

When a logic high level is transmitted from the DFF to the scan line connected to the TFT array of the LCD, the logic level at the Pre-Q terminal (previous stage), and the Q terminal (this stage) is sequentially changed from logic low to logic high, and to logic low again. In the regular conduction, i.e., there is nothing wrong in transmitting the signal by the DFF, according to the logic level at the control gate of the transmission gate 67 in FIG. 9A–9C, the logic level changes in the fault detection and correction circuit does not influence the output signal to the scan bus and the D terminal of the DFF in the next stage.

The fault detection and correction circuit according to the present invention can detect stuck-at-zero fault and stuck-at-one fault due to the stuck-at-zero detecting device and the stuck-at-one detecting device proposed by one preferred embodiment of the present invention. The principle of detecting the stuck-at-zero fault and the stuck-at-one fault is described below. If the output of the DFF of the previous stage is logic high level, the fault detection and correction circuit will suspend in an intermediate state. And then if the output of the DFF of the present stage is not logic high level when the following clock pulse entered the DFF of the present stage, it is defined that there is a stuck-at-zero fault happened in the present DFF. If the output of the DFF of the present stage is logic high level, which is the same as that of the RESET terminal, it is defined that there is a stuck-at-one fault happened in the present DFF.

On the other hand, when the DFF of the present stage is of its regular conduction, the outputs of the stuck-at-one detecting device and the stuck-at-zero detecting device are both logic high level, such that the output of the NAND gate 65 (referring back to FIG. 8) is of the logic low level. If one of the foregoing faults happened, i.e., stuck-at-zero fault or stuck-at-one fault, the output of the NAND gate 65 will be logic high level, and this will permanently cut off the electrically coupling between the DFF of this stage and the scan line connected to the terminal 70. According to the description above, it is clear that the fault detection and correction circuit has no influence on the output of the DFF connected to the fault detection and correction circuit when there is nothing wrong with the DFF of the present stage. In other words, the charge/discharge from the DFF to the scan bus is properly happened in spite of the fault detection and correction circuit proposed by the present invention. However, the electricity between the DFF to the scan bus is isolated when there is a stuck-at-zero fault or a stuck-at-one fault happened in the DFF of the present stage.

Figure 9B:
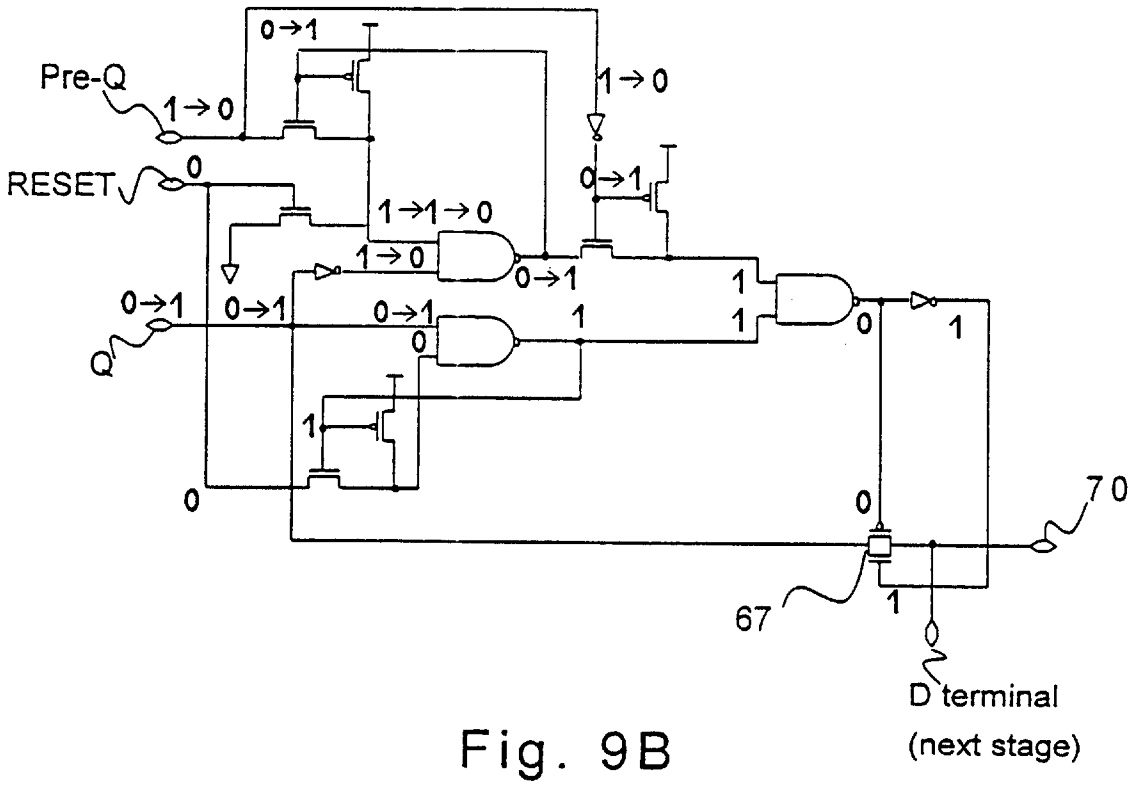
FIG. 9B depicts the logic level transition at each node of the fault detection and correction circuit in the present invention when the high voltage level is transmitted from the previous stage DFF to the present stage DFF.
Figure 9C:
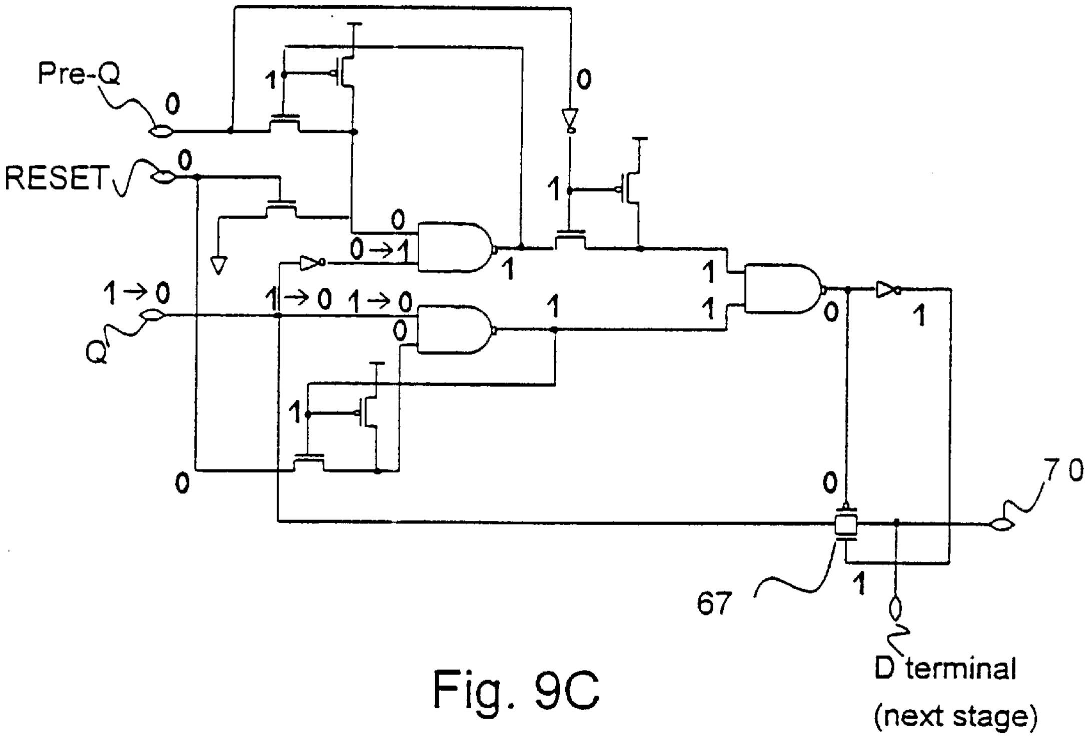
FIG. 9C depicts the logic level transition at each node of the fault detection and correction circuit in the present invention when the high level is transmitted from the present stage DFF to the next DFF.
Figure 10A:
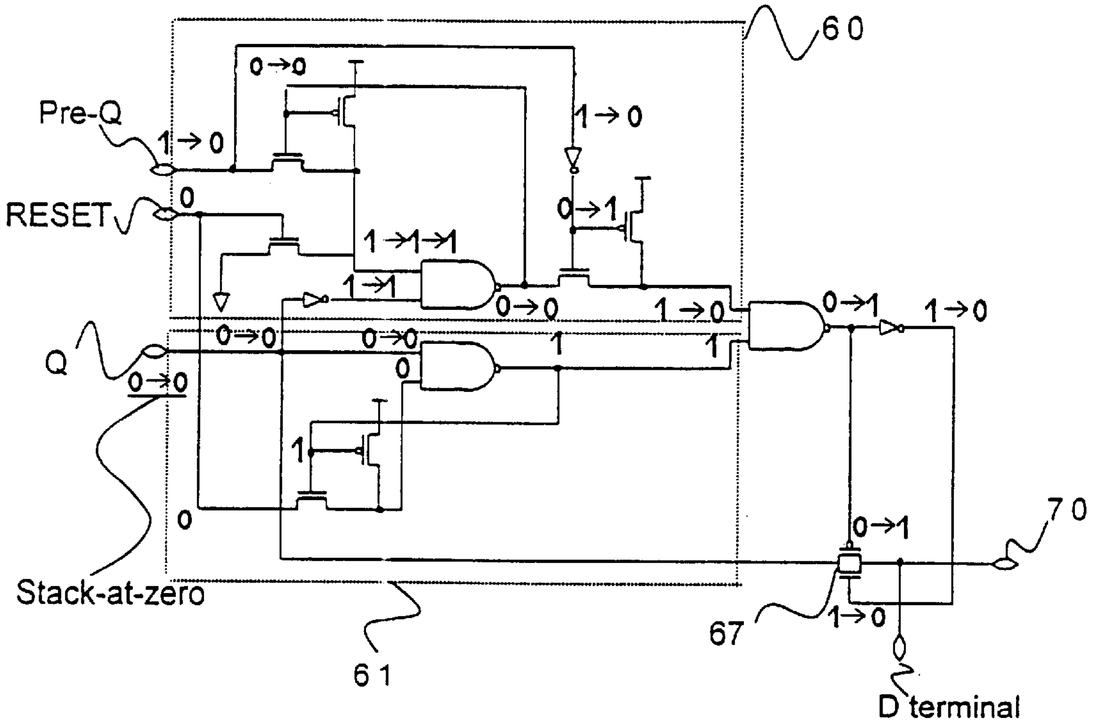
FIG. 10A depicts the logic level transition at each node of the fault detection and correction circuit in the present invention when the stuck-at-zero fault happened.

Referring to FIG. 10A, when the voltage at the terminal Pre-Q changed from high logic level to low logic level, and the Q terminal of the fault detection and correction circuit stuck at zero, i.e., changed from low logic level (previous period) to low logic level (present period), the transition from FIG. 9B to FIG. 9C is disabled.

In addition, the transition of logic level at each node of the stuck-at-zero detecting device 60 is shown in FIG. 10A. Observing the logic levels at the control gate of the transmission gate 67, it is obvious that the DFF of the present stage coupled to the Q terminal of the fault detection and correction circuit shown in FIG. 10A is isolated to the scanning bus coupled to the terminal 70. On the contrary, when the Q terminal of the fault detection and correction circuit is stuck at one, i.e., the reset process is enabled at the time when the stuck-at-one detecting device 61 (FIG. 10B) started. The DFF of the present stage can not charge/discharge the scan bus coupled to the terminal 70.

Figure 10B:
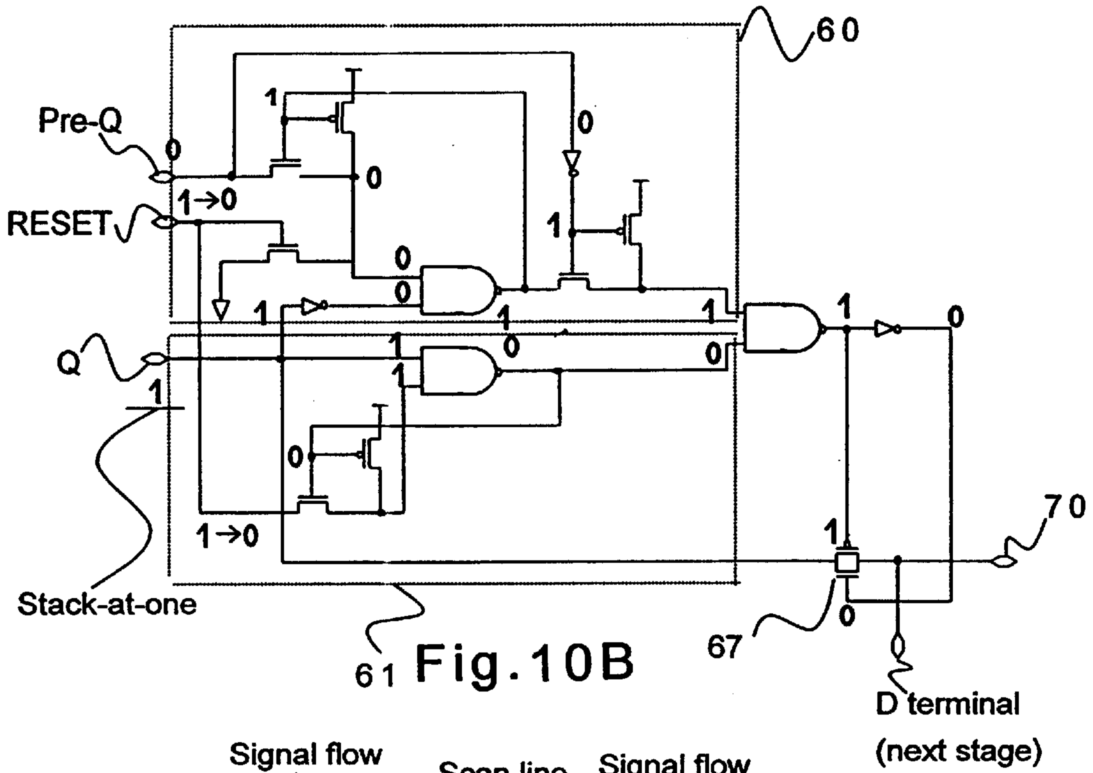
FIG. 10B depicts the logic level transition at each node of the fault detection and correction circuit in the present invention when the-at-one fault happened.

Referring to FIG. 10B, it is clearly that the D terminal of the DFF in the next stage can get the signal only from the scan bus coupling to the terminal 70, which is connected to the scan driver 31(referring to FIG. 3) on the other side of the panel 30. In other words, in the present invention, if stuck-at-one fault or stuck-at-zero fault happened in a DFF of the previous stage, the signal fed to the DFF in the present stage is provided by the DFF in the previous stage at the other side of the panel.

Figure 11:
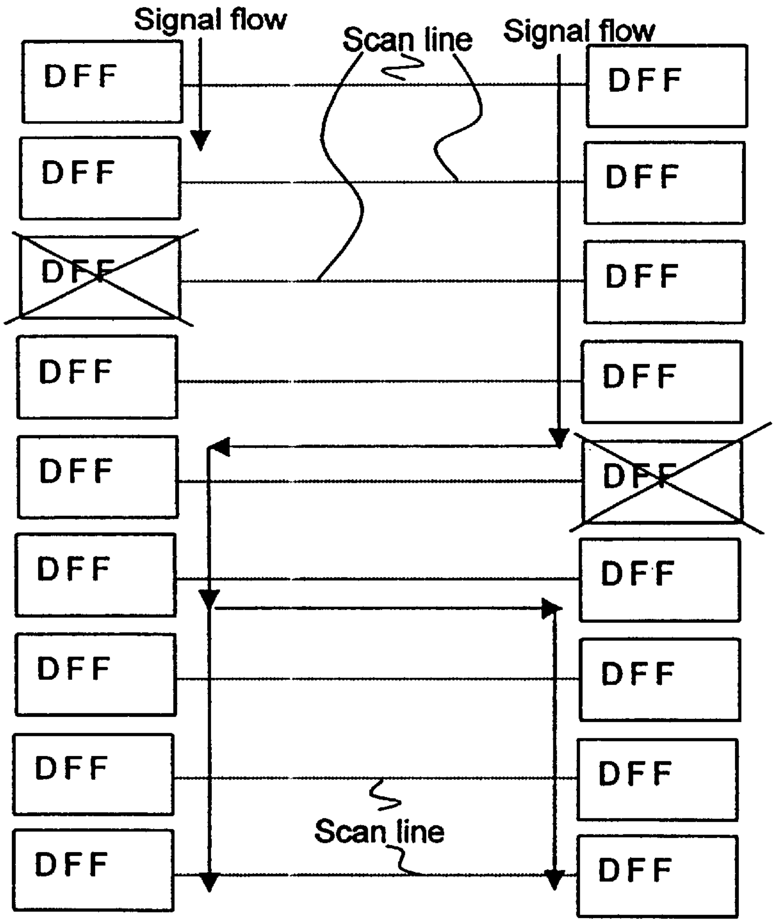
FIG. 11 illustrates the path of the transmitted data in the scan bus and scan driver according to the present invention when two DFFs being out of order.

For example, if the fault detection and correction circuit is employed in the LCD panel to couple the DFF, for brief, the fault detection and correction circuit is not detailed in FIG. 11, and the left column of DFFs are in a scan driver fabricated at one side of the panel, besides, the right column of DFFs are in a scan driver fabricated at the other side of the panel. Assume the third DFF in the scan driver on the left side and the fifth DFF in the scan driver on the right side are out of order, the signal flow is shown as that in FIG. 11. However, if the fault detection and correction circuit is not employed, or the prior art fault detection and correction circuit is utilized, the signal flow at the right side will be terminated at the sixth scan bus, and the following scan bus are not available due to the signal can not be transmitted from the fifth DFF at the right side through the scan bus to the sixth DFF at the left side in the prior art fault detection and correction circuit. In conclusion, because the fault detection and correction circuit according to the present invention is employed to couple the DFF and the scan bus, and the scan driver having the fault detection and correction circuit and the DFF are placed at both ends of the scan bus, so the transmitted data in the scan driver can skip the DFF, which has stuck-at-one fault or stuck-at-zero fault.

As will be understood by persons skilled in the art, the foregoing preferred embodiment of the present invention is illustrative of the present invention rather than limiting the present invention. Having described the invention in connection with a preferred embodiment, for example, the scan drivers are coupled to both sides of a scan bus is used in the preferred embodiment, then the modification will now suggest itself to those skilled in the art. While the preferred embodiment of the invention has been illustrated and described, it will be appreciated that various changes can be made therein without departing from the spirit and scope of the invention.

What is claimed is:

1. A fault detection and correction circuit for determining whether transmitting signal from a first D-type Flip Flop (DFF) at present stage into input terminal of a second DFF at next stage or transmitting signal from a third DFF at present stage through a scan bus into said second DFF, said fault detection and correction circuit comprising:

first detecting means for generating a first logic level at output terminal of said first detecting means responding to a stuck-at-zero fault happened in said first DFF, said first DFF, said second DFF, said third DFF, and said scan bus being formed on a substrate, output terminal of a fourth DFF at previous stage being coupled to input terminal of said first detecting means;

second detecting means for generating said first logic level at output terminal of said second detecting means responding to a stuck-at-one fault happened in said first DFF;

control signal generating means for generating a first control signal when all input terminals of said control signal generating means exhibiting a second logic level, said control signal generating means generating a second control signal when one of input terminals of said control signal generating means exhibiting said first logic level, output terminals of said first detecting means and said second detecting means being coupled to input terminals of said control signal generating means; and transmission control means for transmitting signal from said first DFF to said second DFF and said scan bus responding to said first control signal, said transmission control means cutting off electrical coupling between said first DFF and said second DFF as well as said scan bus responding to said second control signal, and then signal from said third DFF being transmitted through said scan bus to said second DFF, one side of said scan bus being electrically coupled to said first DFF locating at one side of said substrate, the other side of said scan bus being electrically coupled to said second DFF locating at the other side of said substrate, said stuck-at-zero fault being defined as any DFF permanently having output equal to logic zero in spite its input, said stuck-at-one fault being defined as any DFF permanently having output equal to logic one in spite its input, activity of a plurality of thin film transistors being controlled by signal on said scan bus, electricity of said plurality of thin film transistors controlling orientation of polarity of molecules of liquid crystal of said pixel placed over said substrate.

2. The fault detection and correction circuit as in claim 1, wherein said first detecting means, said second detecting means, said control signal generating means, and said transmission control means is fabricated on said substrate, said substrate is chosen form one of the group consisting of: a silicon wafer and said transparent substrate.

3. The fault detection and correction circuit as in claim 2, wherein said first detecting means, said second detecting means, said control signal generating means, and said transmission control means is integrated by LTPS (Low Temperature Polycrystalline Silicon) process on said transparent substrate.

4. The fault detection and correction circuit as in claim 1, wherein said scan bus being coupled to said plurality of thin film transistors (TFT).

5. The fault detection and correction circuit as in claim 1, wherein said first detecting means comprising a first NAND gate, a first transistor, a second transistor, a third transistor, a fourth transistor, a fifth transistor, a first inverter, and a second inverter.

6. The fault detection and correction circuit as in claim 1, wherein said second detecting means comprising a sixth transistor, a seventh transistor, and a second NAND gate.

7. The fault detection and correction circuit as in claim 6, wherein either of said first control signal and said second control signal comprising a logic high level and a logic low level.

8. The fault detection and correction circuit as in claim 1, wherein said control signal generating means comprising a third NAND gate and a third inverter, output terminals of said control signal generating means being coupled to said transmission control means to provide said first control signal and said second control signal to said transmission control means.

9. The fault detection and correction circuit as in claim 1, wherein said transmission control means is a transmission gate comprising a CMOS (Complementary Metal Oxide Semiconductor Field Effect Transistor) transmission gate having a first control gate, a second control gate, an input terminal, and an output terminal, either said first control signal or said second control signal being coupled to said first control gate and said second control gate at a time.

10. The fault detection and correction circuit as in claim 9, wherein said CMOS transmission gate is conductive between said input terminal and said output terminal when said first control signal being coupled to said first control gate and said second control gate.

11. The fault detection and correction circuit as in claim 9, wherein said CMOS transmission gate is insulating between said input terminal and said output terminal when said second control signal being coupled to said first control gate and said second control gate.

12. The fault detection and correction circuit as in claim 1, wherein said first logic level is a logic low level, and said second logic level being a logic high level.

13. A driving apparatus of a LCD (Liquid Crystal Display) with fault detection and correction function, said driving apparatus comprising:

first driving means for transmitting signal from a Delay-type flip flop (DFF) in said first driving means at previous stage through the other DFF in said first driving means at present stage to another DFF in said first driving means at next stage;

second driving means for transmitting signal from the DFF in said second driving means at previous stage through the other DFF in said second driving means at present stage to another DFF in said second driving means at next stage;

a plurality of scan buses for coupling said first driving means and said second driving means at the DFF of the same stage, each of said first driving means and said second driving means comprising a plurality of delay-type flip flops (DFF) and a plurality of fault detection and correction circuits, input terminals of each of said plurality of fault detection and correction circuits being coupled to one of said plurality of DFFs at previous stage and coupled to one of said plurality of DFFs at present stage, output terminal of each of said plurality of fault detection and correction circuits being coupled to a scan bus of said plurality of scan buses and one of said plurality of DFFs at next stage, said fault detection and correction circuit being utilized to determine whether transmitting signal from a first Delay type Flip Flop (DFF) at present stage into input terminal of a second DFF at next stage or transmitting signal from a third DFF at present stage through a scan bus into said second DFF, said fault detection and correction circuit comprising:

first detecting means for generating a first logic level at output terminal of said first detecting means responding to a stuck-at-zero fault happened in said first DFF, said first DFF, said second DFF, said third DFF, and said scan bus being formed on a substrate, output terminal of a fourth DFF at previous stage being coupled to input terminal of said first detecting means;

second detecting means for generating said first logic level at output terminal of said second detecting means responding to a stuck-at-one fault happened in said first DFF;

control signal generating means for generating a first control signal when all input terminals of said control signal generating means exhibiting a second logic level, said control signal generating means generating a second control signal when one of input terminals of said control signal generating means exhibiting said first logic level, output terminals of said first detecting means and said second detecting means being coupled to input terminals of said control signal generating means; and transmission control means for transmitting signal from said first DFF to said second DFF and said scan bus responding to said first control signal, said transmission control means cutting off electrical coupling between said first DFF and said second DFF as well as said scan bus responding to said second control signal, and then signal from said third DFF being transmitted through said scan bus to said second DFF, one side of said scan bus being electrically coupled to said first DFF locating at one side of said substrate, the other side of said scan bus being electrically coupled to said second DFF locating at the other side of said substrate, said stuck-at-zero fault being defined as any DFF permanently having output equal to logic zero in spite its input, said stuck-at-one fault being defined as any DFF permanently having output equal to logic one in spite its input, activity of a plurality of thin film transistors being controlled by signal on said scan bus, electricity of said plurality of thin film transistors controlling orientation of polarity of molecules of liquid crystal of said pixel placed over said substrate.

14. The driving apparatus as in claim 13, wherein one side of said plurality of scan buses is coupled to said plurality of first driving means, the other side of said plurality of scan buses is coupled to said plurality of second driving means.

15. The fault detection and correction circuit as in claim 13, wherein said first detecting means, said second detecting means, said control signal generating means, and said transmission control means are fabricated on said substrate, said substrate is chosen form one of the group consisting of: a silicon wafer and said transparent substrate.

16. The fault detection and correction circuit as in claim 15, wherein said first detecting means, said second detecting means, said control signal generating means, and said transmission control means are integrated by LTPS (Low Temperature Polycrystalline Silicon) process on said transparent substrate.

17. The driving apparatus as in claim 13, wherein said scan bus being coupled to said plurality of thin film transistors (TFT).

18. The driving apparatus as in claim 13, wherein said first detecting means comprising a first NAND gate, a first transistor, a second transistor, a third transistor, a fourth transistor, a fifth transistor, a first inverter, a second inverter, and a first NAND gate.

19. The driving apparatus as in claim 13, wherein said second detecting means comprising a sixth transistor, a seventh transistor, and a second NAND gate.

20. The driving apparatus as in claim 13, wherein said control signal generating means comprising a third NAND gate and a third inverter, output terminals of said control signal generating means being coupled to said transmission control means to provide said first control signal and said second control signal to said transmission control means.

21. The driving apparatus as in claim 20, wherein either of said first control signal and said second control signal comprising a logic high level and a logic low level.

22. The driving apparatus as in claim 13, wherein said transmission control means is a transmission gate comprising a CMOS (Complementary Metal Oxide Semiconductor Field Effect Transistor) transmission gate having a first control gate, a second control gate, an input terminal, and an output terminal, either said first control signal or said second control signal being coupled to said first control gate and said second control gate at a time.

23. The driving apparatus as in claim 22, wherein said CMOS transmission gate being conductive between said input terminal and said output terminal when said first control signal being coupled to said first control gate and said second control gate.

24. The driving apparatus as in claim 22, wherein said CMOS transmission gate being insulating between said input terminal and said output terminal when said second control signal being coupled to said first control gate and said second control gate.

25. The driving apparatus as in claim 13, wherein said first logic level is a logic low level, and said second logic level being a logic high level.

* * * * *